（12）United States Patent
Chen et al.

(10) Patent No.: US 7,391,925 B2
(45) Date of Patent: Jun. 24, 2008

(54) SYSTEM AND METHOD FOR ESTIMATING NOISE USING MEASUREMENT BASED PARAMETRIC FITTING NON-UNIFORMITY CORRECTION

(75) Inventors: Hai-Wen Chen, Orlando, FL (US); Felix M. Fontan, Orlando, FL (US); Teresa L. Olson, Winter Garden, FL (US)

(73) Assignee: Lockheed Martin Missiles & Fire Control, Orlando, FL (US)

( * ) Notice: Subject to any disclaimer, the term of this patent is extended or adjusted under 35 U.S.C. 154(b) by 875 days.

(21) Appl. No.: 10/727,039

(22) Filed: Dec. 4, 2003

(65) Prior Publication Data

US 2005/0157942 A1 Jul. 21, 2005

(51) Int. Cl.
*H04N 5/217* (2006.01)

(52) U.S. Cl. .................... 382/275; 382/221; 382/223; 348/241

(58) Field of Classification Search ................ 348/241
See application file for complete search history.

(56) References Cited

U.S. PATENT DOCUMENTS 5,317,420 A * 5/1994 Kuwahara .................. 358/463
2002/0159101 A1 * 10/2002 Alderson et al. ............ 358/504
2003/0107666 A1 * 6/2003 Harton et al. ............... 348/310
2004/0017891 A1 * 1/2004 Endo ......................... 378/98.8
2004/0027469 A1 * 2/2004 Tsuruoka .................... 348/241

* cited by examiner

*Primary Examiner*—Jingge Wu
*Assistant Examiner*—John W Lee
(74) *Attorney, Agent, or Firm*—Birch, Stewart, Kolasch & Birch, LLP

(57) ABSTRACT

A system and method for estimating noise using measurement based parametric fitting non-uniformity correction is disclosed. Fixed pattern noise ("FPN") is estimating from an overall noise component within a detection system to enhance candidate target detection and tracking. A sensor in the detection system receives energy, such as radiant flux, that is converted to a digital image. A non-uniformity correction device generates an estimated FPN according to an applicable temperate range and integration time. A memory storing an array of coefficients is accessed to determine the estimated FPN. The valves within the array of coefficients are based on actual FPN measurements that are parametrically fitted.

25 Claims, 4 Drawing Sheets

SYSTEM AND METHOD FOR ESTIMATING NOISE USING MEASUREMENT BASED PARAMETRIC FITTING NON-UNIFORMITY CORRECTION

FIELD OF THE INVENTION

The present invention relates to a non-uniform correction system and method to estimate fixed pattern noise from the total noise in a candidate target detection, identification and tracking system. More particularly, the present invention relates to a non-uniform correction system and method to provide higher sensor sensitivity by estimating fixed pattern noise using measurement based parametric fitting non-uniform correction.

BACKGROUND OF THE RELATED ART

Fixed pattern noise ("FPN") is a component of the overall total noise in a candidate target detection and tracking system. For example, an infrared ("IR") sensor on a missile can have FPN in addition to other noise. A high count of FPN reduces a detection sensor's sensitivity and hampers target tracking and identification due to a large noise component. In typical sensor applications, the standard deviation of FPN from a raw, uncorrected image can be as high as 300-400 counts. A count corresponds to the IR energy received at the IR detectors. A count can be proportional to the output voltage from the detectors for the received IR energy. For example, a weak potential target can have 10 to 20 counts. Temporal noise can be 1 to 2 counts, varying according to the outside temperature. A high count of FPN prevents detection of weak targets.

One purpose of any candidate target detection and tracking system is to identify candidate targets as early as possible. A non-uniformity correction ("NUC") system reduces FPN to allow early target detection and reliable target tracking and recognition/identification. Traditional NUC systems seek to reduce the FPN to around or below the temporal noise ("TN") level.

Known NUC systems incorporate a rotating "chopper-wheel," or a blurring/deform lens, to separate the outside scene and the inside FPN on the focal plane array ("FPA") of the sensor. A chopper wheel system rotates the blurring lens to remove the FPN from the total noise component. The chopper wheel system uses a motor to rotate the lens across the FPA. The hardware and software components to implement a chopper wheel with a lens and motor takes up space within the missile or detection device and adds complexity and cost. As detection systems get smaller, space can become a critical constraint on future designs for missiles, aircraft, and the like.

Other known NUC systems include scene-based NUC. Scene-based NUC systems use dithering to reduce the FPN. One-pixel level FPA dithering movement is difficult to control within scene-based NUC systems, and the rate of reducing the FPN is slow. Scene-based NUC systems can use a convergent median filter, but this change results in the rate of reducing the FPN being even slower.

Other NUC systems use estimated FPN components to remove the FPN from a received frame. Estimating FPN over the temperature ranges needed for today's applications and platforms is complex. Offset and gain values related to the received flux energy can vary greatly, over different temperature ranges. The estimation algorithms include high-order polynomials that result in complex processing loads on the detection sensor.

Removal or reduction of the FPN in a detection sensor is needed to maximize potential target identification, to detect targets early and to maintain tracking of an acquired target. Known NUC systems that estimate and reduce FPN, however, tend to be slow or not feasible due to their size.

SUMMARY OF THE INVENTION

Accordingly, the present invention is directed to a system and method for a measurement based parametric fitting NUC device that solves the deficiencies and shortcomings of the related art. The present invention discloses the use of measurement-based parametric fitting to estimate the FPN from the sensor without the need for complex processing or high-order polynomial algorithms.

Additional features and advantages of the embodiments of the present invention are set forth in the detailed description that follows. The additional features and advantages are apparent from the description, or can be learned by practice of the invention. The objectives and other advantages of the embodiments of the present invention are realized and attained by the disclosure particularly pointed out in the written description and claims, as well as the drawings.

To achieve these and other advantages, a system for estimating noise in a detection sensor is disclosed. The system can use a digital image of pixels corresponding to energy received at the sensor. The system also includes a non-uniformity correction device to remove estimated fixed pattern noise from the pixels of the digital image to generate a corrected digital image. The system also includes a memory having an array of coefficients to determine the estimated fixed pattern noise. The array of coefficients are based on actual fixed pattern noise measurements that are parametrically fitted over a plurality of temperature ranges.

Further, according to embodiments of the present invention, a method for estimating noise in a sensor is disclosed. The method includes converting received energy into a digital image. The method also includes estimating fixed pattern noise in the digital image by using an array of coefficients of parametrically fitted measurements of actual fixed pattern noise over a temperature range of a plurality of temperature ranges.

It is understood that both the foregoing general description and the following detailed description are exemplary and explanatory, and are intended to provide further explanation of the invention as claimed below.

BRIEF DESCRIPTION OF THE DRAWINGS

The accompanying drawings that are included to provide further understanding of the disclosed invention and are incorporated in and constitute a part of this specification, illustrate embodiments of the disclosed invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1A:
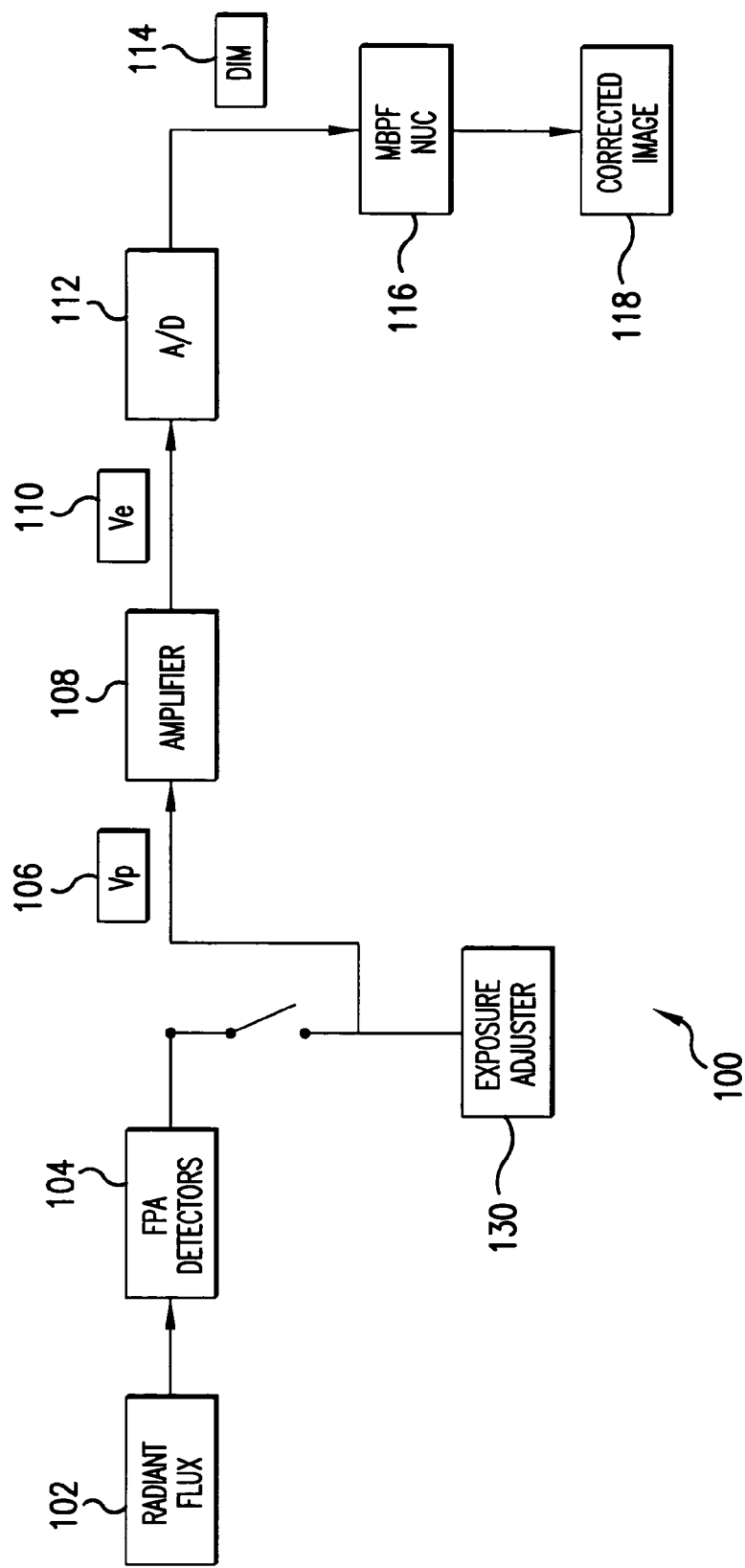
FIG. 1A illustrates a seek and detect system within a sensor according to the present invention.

FIG. 1A depicts a seek and detect system 100 within a sensor according to the present invention. Preferably, the sensor using system 100 is an infrared ("IR") sensor. More preferably, the sensor using system 100 is an infrared sensor configured on a missile.

System 100, however, is not limited to missiles, and is applicable for many uses and platforms, including video surveillance and tracking systems, and any other system needing sensors for temperature measurements, such as remote sensing, ground surveillance, weather forecasts, building inspection, electrical/mechanical inspection, buried object detection, non-destructive testing, and the like.

Other applications for system 100 include any application using IR sensors, such as anti-armor missiles, early warning systems, fire control systems, anti-personnel ordinance, and the like.

System 100 processes image data related to received radiant flux 102 prior to performing target detection and tracking functions. The output of system 100 is the estimated FPN, which may be removed to generate corrected image 118. Corrected image 118 has the dead pixels and the FPN removed, or reduced, by measurement based parametric fitting NUC system 116. This process is disclosed in greater detail below.

Radiant flux 102 is received at focal plane array detectors 104. Preferably, radiant flux 102 is the radiant infrared energy reflected from the candidate target. Alternatively, the reflected energy also can be radio frequency energy or other parts of the electromagnetic spectrum. Further, radiant flux 102 also can be energy transmitted or refracted from the candidate target. Focal plane array detectors 104 detect radiant flux 102. Detectors 104 are any detectors known to those skilled in the art, or developed in the future, that can sense energy.

System 100 includes focal plane array exposure adjustor 130. Exposure adjustor 130 preferably is a number of capacitors, $C_1$ to $C_N$. Exposure adjustor 130, however, can be any means, device, system, software and the like that exposes detectors 104 to radiant flux 102. Exposure adjustor 130 provides integration time control of FPA detectors 104 for system 100. The integration time of exposure adjustor 130 controls the sensitivity and temperature dynamic range of system 100. The exposure time allowed by exposure adjustor 130 varies according to the specifications for the sensitivity of system 100.

Exposure adjustor 130 affects the sensitivity of the sensor employing system 100 by varying the integration times of FPA detectors 104. A higher integration time for exposure adjustor 130 results in a higher output voltage 106 from FPA detectors 104. The gain of output voltage 106 is adjusted depending on several factors, including temperature, level of desired detection, saturation limits of FPA detectors 104, and the like. Preferably, an increased integration time will increase the exposure time of FPA detectors 104 to received radiant flux 102.

Output voltage 106 is inputted into amplifier 108. Amplifier 108 amplifies output voltage 106 to generate amplified voltage 110. The gain provided by amplifier 108 can vary according to the parameters and sensitivity of system 100. For example, output voltage 106 is amplified to increase the received signal from radiant flux 102, but not enough to cause saturation of the signal. Weak signals are amplified to prevent starvation, which results from too low of a gain for detection processing.

Amplified voltage 110 can be converted into a digital representation by focal plane array analog to digital ("A/D") converter 112. Thus, A/D converter 112 converts the voltage associated with received radiant flux 102 to a digital value, or "counts". A/D converter 112 outputs digital image ("DIM") 114. Alternatively, DIM 114 can be received directly from a digital output sensor or detector. In this instance, A/D converter 112 is not utilized. DIM 114 also can be preprocessed by other functions or components of system 100.

DIM 114 contains strong non-uniform/fixed pattern noise, or FPN, as well as permanent and blinking dead pixels. Permanent dead pixels are those pixels resulting from inconsistencies in responding to the radiant flux input due to FPA manufacturing errors that are permanent in nature. Blinking dead pixels are those pixels that are temporarily inconsistent due to processing errors. Dead pixels and the FPN hamper target detection and tracking in subsequent applications within the sensor. DIM 114 is input to measurement based parametric fitting NUC component 116. Measurement based parametric fitting NUC component 116 replaces the dead pixels and estimates the FPN within DIM 114. NUC component 116 also can reduce, or remove, the estimated FPN from DIM 114. Measurement based parametric fitting NUC component 116 outputs corrected image 118. Corrected image 118 is a corrected digital representation of received radiant flux 102 having the FPN reduced, or removed, for increased target detection, identification and tracking capabilities.

Figure 1B:
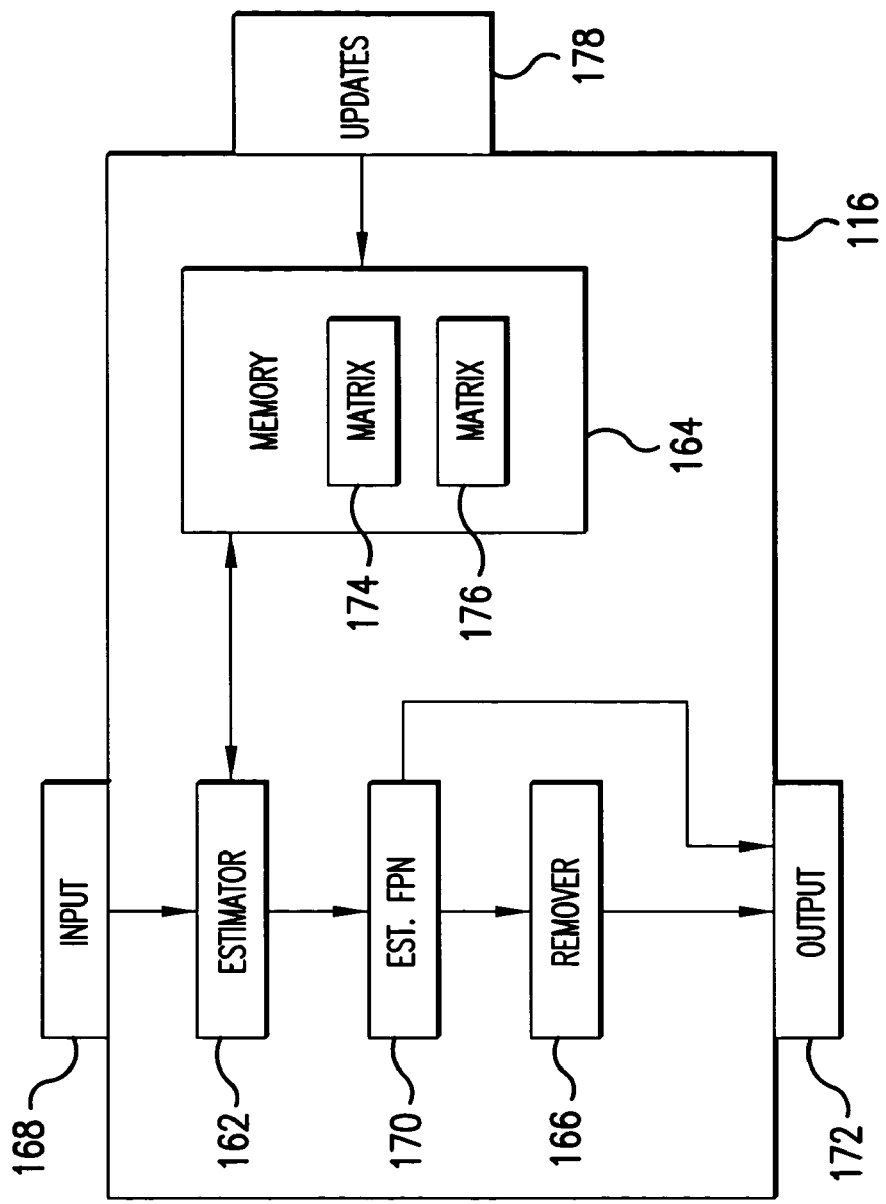
FIG. 1B illustrates a block diagram of a NUC component according to the present invention.

FIG. 1B depicts a block diagram of NUC component 116 according to the present invention. NUC component 116 correlates to NUC component 116 shown in FIG. 1A. NUC component 116 of FIG. 1A, however, is not limited by the disclosure of NUC component 116 in FIG. 1B. NUC component 116 performs measurement based parametric fitting non-uniformity correction on digital images. Specifically, NUC component 116 estimates the FPN in a digital image.

NUC component 116 includes estimator 162, memory 164, remover 166, input 168, and output 172. NUC component 116 can be implemented by a hardware configuration or software configuration, or any combination of hardware/software configuration known to those skilled in the art. NUC component 116 receives digital images, either unprocessed, or "raw," or pre-processed, through input 168. NUC component 116 then performs various functions using the data from a received digital image, including estimating an estimated FPN 170 of the digital image.

Estimator 162 estimates estimated FPN 170 in a digital image for NUC component 116. Estimator 162 accesses memory 164. Estimator 162 retrieves an array of coefficients from a matrix 174 in memory 164. Matrix 174 includes values in the array of coefficients to estimate the FPN according to various parameters, such as time of day, system integration time, temperature, season, and the like. Estimator 162 uses the array of coefficients to estimate estimated FPN 170 in the digital image.

Memory 164 can be any memory or storage medium that allows data or information to be stored for retrieval by other sub-components of NUC component 116. For example, memory 164 may be random access memory, read-only memory, flash memory, a disk, and the like. Memory 164 also can store any number of matrices of coefficient arrays. For example, FIG. 1B depicts matrices 174 and 176, and estimator 162 can select the appropriate matrix according to certain parameters, such as time of day or season. Memory 164 also can store other objects or files for use within or outside NUC component 116.

In a preferred embodiment of the present invention, memory 164 can receive updates to its stored matrices by loading updated or new data. As new measurement-based fitted values become available, NUC component 116 is updated to provide increasingly accurate estimation of FPN. Thus, referring to FIG. 1B, updates 178 are received and used to update information stored in memory 164.

Estimated FPN 170 is determined by estimator 162. Estimated FPN 170 can be directly outputted from NUC component 116 through output 172 for operations or analysis by other components within a sensor system. NUC component 116 also can reduce, or remove, estimated FPN 170 from the received digital image by using remover 166. For example, remover 166 can subtract the values of estimated FPN 170 from the pixels, or other applicable data, within the received digital image, such as DIM 114. Remover 166 can receive the digital image from input 168 to reduce the actual FPN using estimated FPN 170. Remover 166 seeks to remove the actual FPN using accurate values for estimated FPN 170.

Preferably, NUC component 116 can be implemented using a processor that includes instructions to execute the different functions disclosed for estimating estimated FPN 170. NUC component 116 also includes the processor coupled to or accessing memory 164. NUC component 116 also may download instructions in the form of a software program to perform the functions using a processor.

Figure 2:
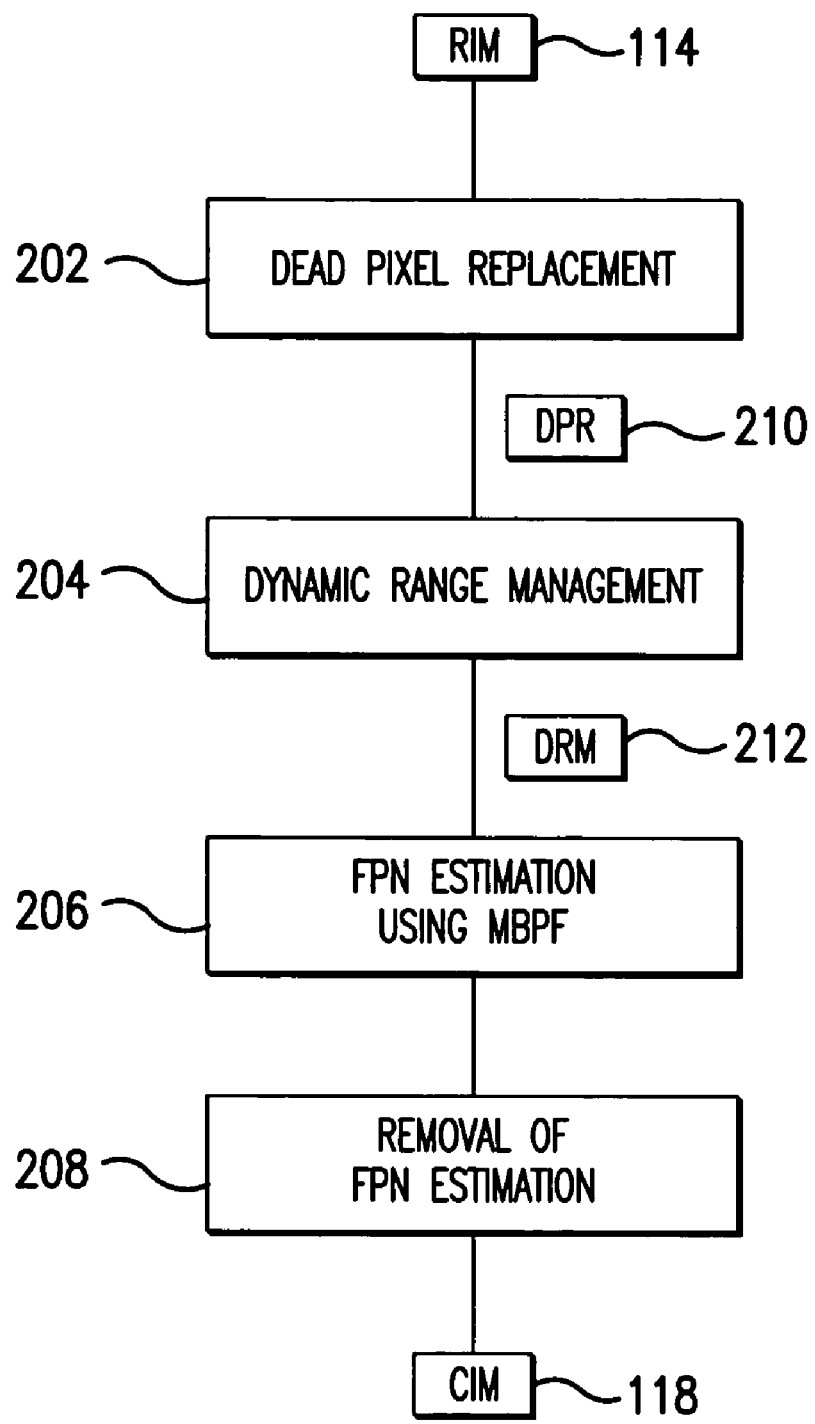
FIG. 2 illustrates a functional block diagram of a measurement based parametric fitting NUC system according to the present invention.

FIG. 2 depicts a functional block diagram of measurement based parametric fitting NUC component 116 according to the present invention. Measurement based parametric fitting NUC component 116 includes at least three functions, as shown in FIG. 2. Function 202 is permanent and blinking, or deviant, dead pixel replacement of DIM 114. The function uses global and/or local thresholding techniques in removing the dead pixels. Again, dead pixels are those pixels exhibiting processing inconsistencies in DIM 114. The function outputs dead pixel replacement ("DPR") image 210, which is a modified DIM 114 that has the dead pixels removed.

Function 204 of NUC component 116 is temperature dynamic range management, which involves integration time, system gain, and sensitivity control. The function seeks to optimally satisfy the requirements of the temperature dynamic range, and system sensitivity and detectivity. Different integration times and electronic gains are assigned to different temperature sub-dynamic ranges received by system 100. Examples of preferable sub-dynamic ranges are disclosed in greater detail below.

DRM function 204 of NUC component 116 outputs dynamic range management image 212. DRM function 204 operates similar to the automatic gain control in a radio system by adaptively adjusting the integration time of the focal plane arrays to meet the requirements of both the sensor sensitivity and operating temperature dynamic range. DRM function 204 also handles the pixel-saturation issues by reducing the integration time of exposure adjustor 130 where appropriate.

In conventional NUC components using a chopper wheel, a dynamic range management function frequently switches the integration times to keep the pixel intensity at the middle-intensity-counts to avoid pixel starvation and saturation situations. This switching can result in many different integration times and gains, sometimes changing for every frame of received radiant flux 102, which adds complexity. According to the preferred embodiments of the present invention, the number of switches to different integration times is reduced. Thus, the complexity of DRM function 204 is reduced because of a lower number of integration times and gains over conventional NUC components.

For a fixed integration time, the gain and offset coefficients used to estimate the FPN, such as estimated FPN 170 in FIG. 1B, for each pixel are constant for a large temperature dynamic range. For different integration times, however, the coefficients can change dramatically. Therefore, DRM function 204 prefers to use a small number of operating integration times so that a large number of coefficients sets are not needed to estimate the FPN, such as estimated FPN 170. A few integration times are pre-selected depending on the requirements for sensitivity and dynamic range, DRM function 204 adaptively chooses the appropriate integration time depending on the background temperatures of radiant flux 102 and any pixel-saturation situations.

The appropriate integration times and background temperatures can vary according to any number of factors, including requirements or specifications of system 100, design limitations, sensor sensitivity, and the like. Alternatively, one integration time can be used for all temperatures. An example of different integration times for different temperatures is disclosed in greater detail below. The values disclosed below are exemplary only, and the present invention is not to be limited by the given examples. The examples are provided for illustrative purposes only. One skilled in the art can vary integration time values, the number of integration times, the switching temperatures, and the number of temperature ranges as desired.

Preferably, in the example, four integration times, 2.5, 5.2, 9.0 and 16.6 milliseconds are selected for DRM function 204 to meet the requirements for both the seeker sensitivity and temperature dynamic range. Different integration times than those within the example can be used. Further, value approximate to these integration times can be used in the example.

Component NUC 116 preferably also uses three integration time-switching temperatures: 0°, 35°, and 70° C. These temperatures are preferable because a longer integration time leads to lower noise equivalent delta temperatures, shorter dynamic range, and more image blurring caused by motion. Further, NUC component 116 prefers to operate at the linear region of the system-dynamic range of each integration time, and the FPN counts relationship is more linear for a shorter sub-dynamic range of temperatures.

For example, an integration time equal to about 16.6 milliseconds is preferable for the sub-dynamic range of −33° C. to 0° C. The integration time of 9 milliseconds is preferable for the sub-dynamic range of 0° C. to 35° C. The integration time of 5.2 milliseconds is preferable for the sub-dynamic range 35° C. to 70° C. The integration time for 2.5 milliseconds is preferable for the situation when the target temperature is equal to or above 70° C.

Function 206 of NUC component 116 is the estimation of the FPN component from DIM 114 using measurement based parametric fitting. NUC component 116 accomplishes these tasks with an increased noise reduction rate, higher correction accuracy, and lower residual FPN than conventional NUC components. Further, measurement based parametric fitting NUC component 116 does not utilize a chopper wheel configuration or complex processing operations in providing the estimated FPN.

Measurement based parametric fitting NUC component 116 estimates the FPN based on empirical measurements. The empirical measurements are used to determine offsets and gains for a variety of temperatures and conditions. Two-piece, or piece-wise, and one-piece linear curve fittings are used for different sub-dynamic ranges to estimate the FPN at different temperatures and integration times. The estimated FPN, such as estimated FPN 170, is used to suppress the actual FPN from DIM 114 to generate corrected image 118.

The estimated FPN can be represented according to Wold's fundamental theorem, which states any stationary discrete-time stochastic process {x(n)} may be expressed as $$x(n)=u(n)+s(n),$$

where frame number n=1, 2, 3, . . . ; u(n) and s(n) are uncorrelated processes; u(n) is a random variable; and s(n) is a deterministic process. If both u(n) and s(n) are zero-mean variables, then $$\text{var}(x)(n)) = E[(x(n) - \text{mean}(x(n)))^2] \quad (1)$$
$$= E[u(n)^2 + 2u(n)s(n) + s(n)^2]$$
$$= E[u(n)^2] + E[s(n)^2] + E[s(n)^2]$$
$$= \text{var}(u(n)) + \text{var}(s(n)),$$

where var stands for variance. Thus, the variance of the stationary discrete-time stochastic process is represented by the sum of the variance of the random variable and the deterministic process.

The single frame noise ("SNF"), or total noise, is a stationary discrete-time stochastic process. Using Wold's theorem disclosed above, the single frame noise can be represented by the sum of the temporal noise ("TN") (a random process) and the fixed pattern noise, or FPN, (a deterministic process), or $$\text{var}(SFN(n))=\text{var}(TN(n))+\text{var}(FPN(n)).$$

In general, the TN and FPN are estimated as their noise standard deviation (std), and thus the quantity of FPN is estimated as:

$$std(FPN(n)) = \sqrt{\text{var}(SFN(n)) - \text{var}(TN(n))} \quad (2)$$
$$= \sqrt{std(SFN(n))^2 - std(TN(n))^2}$$

From Eq. (2), if the SFN and TN are measurable, then the FPN can be estimated. The standard deviation of SFN is calculated from the analog to digital output images, disclosed by DIM 114 that are representative of the flux energy. The calculation of std(TN(n)) is disclosed below.

The variance of difference of two nearby images is expressed as:

$$\text{var}(SFN(n) - SFN(n-1)) = \text{var}([TN(n) + FPN(n)] - \quad (3)$$
$$[TN(n-1) + FPN(n-1)])$$
$$= \text{var}(TN(n) - TN(n-1))$$
$$= 2\,\text{var}(TN(n))$$
$$= 2\,std(TN(n))^2$$

In Eq. (3), the relationship is established that FPN(n)=FPN(n−1). During a short time period, such as between two nearby frames, this relationship is reasonable for a near deterministic process. Therefore, the TN can be estimated as:

$$std(TN(n)) = \frac{1}{\sqrt{2}} std(SFN(n) - SFN(n-1)). \quad (4)$$

In general, the FPN is a deterministic process subject to constant system configuration and environmental conditions, such as the system power-on time, integration time, background temperature, and the like. To quantify the FPN change and any drift amount, a measurement of residual noise (RN) is introduced and defined as:

$$std(RN(n)) = \frac{1}{\sqrt{2}} std(SFN(n+M) - SFN(M)), \quad (5)$$

where, M is a fixed earlier time frame, and n is a later time frame.

The later time frame can be minutes, hours, days, or weeks later. The background temperatures and integration times are different at time M and time (n+M). By comparing Eq. (5) with Eq. (4), if there is no FPN drift between frame M and n+M, then std(RN(n))=std(TN(n)) for a stationary temporal noise. Otherwise, if std(RN(n))≠std(TN(n)), the difference std(RTN(n))−std(TN(n)) indicates the FPN drift. Thus, the FPN drift is represented by the difference between the standard deviation of the residual noise and the standard deviation of the temporal noise within a frame, n.

The FPN drift is defined as the change or difference in the FPN value at different times. The FPN drift could be mischaracterized as a signal change if not accounted for. As noted above, the empirical measurements preferably are performed at different times. The FPN drift can be caused by variations or problems in the pixels or FPA detector 104. The identification of the FPN drift is an improvement over conventional systems that do not dynamically estimate the FPN component as the FPN drift can increase the FPN by as much as 10 counts.

Thus, the FPN is caused by the variation of the gain and offset coefficients of the signal transfer functions in different pixel detectors. In NUC component 116, the disclosed embodiments of the present invention uniformly select temperatures across the whole temperature dynamic range for measurements of the FPN. The laboratory measurements are conducted under different conditions and temperature ranges. Using the empirical measurements, coefficients for the offset and the gain for a specified temperature range is determined, as disclosed in greater detail below. The coefficients are used to determine a linear relationship for estimating the FPN for a given temperature range. A linear relationship is less complex to implementing an FPN estimation algorithm than high order polynomial algorithms.

Using the example disclosed above, for a dynamic range of −33° C. to 70° C., the FPN is measured for each pixel at 38 different temperatures within the range. Standard deviation of the FPN is plotted at different pixel image intensity counts for 100 pixels with the focal plane array integration time of about 5.2 milliseconds. At this integration time condition, an image count of 3,000 is stimulated by a black body temperature of 5° C., and an image count of 12,000 is stimulated by block body temperature of 70° C. The FPN to image count relationship is linear and any curves are fitted using a second order linear polynomial such as y=Ax+B where A and B are the second gain and offset correcting coefficient rates.

The disclosed embodiments of the present invention also measure the any applicable FPN drifts using black body measurements at different days under the exactly same testing conditions, such as temperatures, integration times and the like. Drifts can be defined as any changes in the FPN that occurs at different times under otherwise similar conditions. The residual noise caused by two different days is estimated and plotted. The standard deviation and the residual noise are calculated. A reference frame M is the first frame on the first day with all frames being collected for that day. Frames for the second day are collected and a mean standard deviation for the random noise on the first day is calculated and the mean standard deviation of the random noise on the second day is calculated. Therefore, the FPN drift is the difference between the standard deviation of the residual noises for both days.

Large portions of the drifts can be caused by a few deviant pixels. Deviant pixels are located from the measured data. Therefore, the FPN drifts are considerably reduced by mapping the deviant pixels out and replacing them with the average value of the surrounding pixels. Thus, the FPN drift is reduced by eliminating the deviant pixels.

If the system gain is increased, however, to adjust the sensor sensitivity, the dynamic range requirement of system 100 may not be met or vice versa. According to the disclosed embodiments of the present invention, the dynamic range is divided into three sub-dynamic ranges. Different integration times and gains are assigned to these three specific sub-dynamic ranges. The sub-dynamic range measurements seek to obtain as high as possible sensitivity for each sub-dynamic range, but still meet the minimum and maximum background temperature requirements for IR detection.

Referring back to the above-disclosed example, an integration time approximately equal to 2.5 milliseconds is selected when a very hot target, such as over 70° C., is detected to avoid target saturation. An integration time approximately equal to 2.5 milliseconds also is selected when the platform establishes conventional tracking and/or target recognition, or when the platform is in an end-game mode, such as prior to hitting a tracked target. In contrast, some conventional NUC components have the NUC turned off during end-game mode because the system sensitivity is a problem.

A purpose of NUC, however, is to reduce high count FPN to enhance target tracking and recognition. By selecting a small integration time, the disclosed embodiments of the present invention avoid strong target saturation, and continue to operate NUC function 206 to suppress the FPN artifacts up to reaching the target.

Preferably, the disclosed embodiments of the present invention include dynamic ranges having selected integration times. According to the disclosed example, an integration time approximately equal to 2.5 milliseconds can be selected for target temperatures greater than 70° C. An integration time approximately equal to 5.2 milliseconds can be selected for background temperatures of 35° C. to 70° C.

An integration time approximately equal to 9 milliseconds can be selected for background temperatures of 0 to 35° C. An integration time approximately equal to 16.6 milliseconds can be selected for background temperatures of −33 to 0° C. Alternatively, different integration times can be selected for these temperature ranges. Further, different temperature ranges can be implemented for different integration times. The disclosed embodiments in the present invention are not limited by the example integration times and example ranges given above.

Thus, according to the disclosed embodiments, the focal plane array sensitivity can be estimated for times ranging from 5.2 milliseconds to 16.6 milliseconds under different background temperatures from the collected laboratory measurements. Based on the empirical measurement data, the focal plane array noise equivalent delta temperatures are calculated. The noise equivalent delta temperatures then are calculated for system 100 based on the settings of system 100 and the settings of the camera. The noise equivalent delta temperatures for a system 100 expands the temperature dynamic range from −30° C. to 70° C. Therefore, if the disclosed embodiments of the present invention use integration times between 5.2 milliseconds and 16.6 milliseconds, then system 100 can meet both of the requirements for sensor sensitivity and dynamic range.

The measured focal plane array image data is used to estimate the gain and offset coefficients for the one-piece and two-piece linear equations disclosed below. These equations are the curved fittings for the FPN-counts relationship used by function 206, and thus can be used to estimate the FPN on a pixel according to the pixel's image and density count. The detailed algorithms for calculating coefficients for FPN estimation removal are disclosed below with reference to FIGS. 3A and 3B.

The one-piece linear equation can be applicable over a certain temperature range, while a two-piece linear equation is more applicable over another temperature range. Two-piece linear equations are more complex than one-piece linear equations and are used when the curve fitting requires a more complex representation. Thus, the present invention preferably seeks to fit a one-piece linear equation to the laboratory measurements, but can go to two-piece curve-fitting if desired.

For the low and very high sub-dynamic ranges, a one-piece linear curve-fitting algorithm is applied. The FPN estimation algorithm is:

$$\text{var}(x)(n)) = E[(x(n) - \text{mean}(x(n)))^2] \quad (6)$$
$$= E[u(n)^2 + 2u(n)s(n) + s(n)^2]$$
$$= E[u(n)^2] + E[s(n)^2] + E[s(n)^2]$$
$$= \text{var}(u(n)) + \text{var}(s(n)),$$

This relationship discloses a point-by-point multiplication of the current frame times matrix A and then adds matrix B. This point-by-point multiplication by multiplying every entry in matrix A with the corresponding entry in the current frame. The matrices A and B are calculating using a least-square method based on data from lab measurements for the temperature ranges and integration times R. The corrected image frame, or CIM 118, is obtained by subtracting the estimated FPN from the current raw image frame, or DIM 114. This relationship is shown as:

$$std(FPN(n)) = \sqrt{\text{var}(SFN(n)) - \text{var}(TN(n))} \quad (7)$$
$$= \sqrt{std(SFN(n))^2 - std(TN(n))^2}$$

Figure 3A:
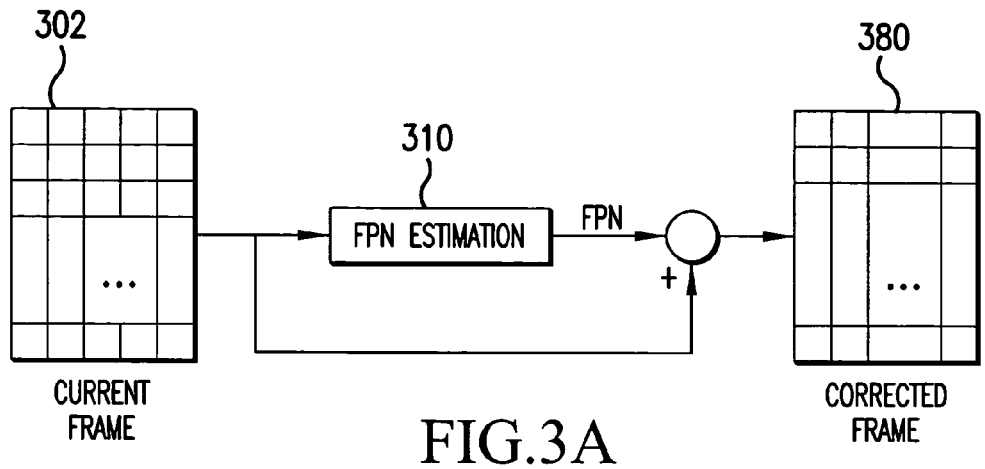
FIG. 3A illustrates a one-piece linear curve-fitting algorithm block diagram according to the present invention.

FIG. 3A depicts a one-piece linear curve-fitting algorithm block diagram according to the disclosed embodiments of the present invention. FIG. 3A depicts the one-piece linear curve-fitting relationship disclosed above. Current frame 302 is inputted into FPN estimator 310. FPN estimator 310 may correspond to estimation 102 shown in FIG. 1B. FPN estimator 310 performs the point-by-point multiplication of current frame 302 with matrix A then adds matrix B. Matrices A and B are calculated using the least-square method based on data from laboratory measurements for a specified range as disclosed above. Alternatively, matrices A and B may be derived or calculated using other known methods or processes. Corrected frame 380 is obtained by subtracting the estimated FPN from the current row image frame, as shown in FIG. 3A.

For the middle and high sub-dynamic ranges, a two-piece piece-wise linear curve-fitting algorithm is applied. This algorithm differs from the one-piece linear curve-fitting algorithm disclosed above. The FPN estimation algorithm for the middle and high sub-dynamic ranges is:

$$\operatorname{var}(SFN(n) - SFN(n-1)) = \operatorname{var}([TN(n) + FPN(n)] - \quad (8)$$
$$[TN(n-1) + FPN(n-1)])$$
$$= \operatorname{var}(TN(n) - TN(n-1))$$
$$= 2\operatorname{var}(TN(n))$$
$$= 2\operatorname{std}(TN(n))^2$$

Otherwise, then the FPN estimation algorithm is:

$$std(TN(n)) = std(SFN(n) - SFN(n-1)). \quad (9)$$

The corrected frame relationship is shown as:

$$std(RN(n)) = \frac{1}{\sqrt{2}} std(SFN(n+M) - SFN(M)), \quad (10)$$

where MIC is the middle temperature intensity count calibrated in the laboratory measurements.

Figure 3B:
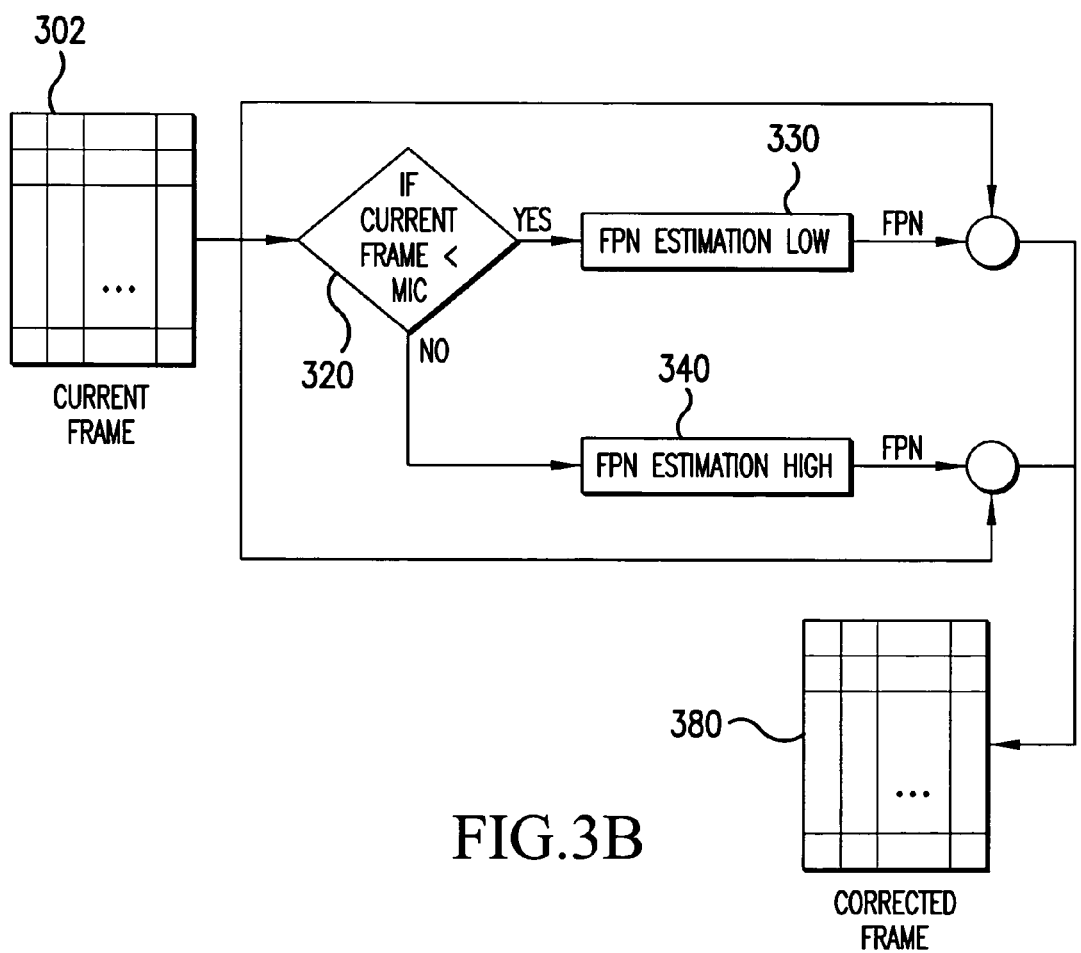
FIG. 3B illustrates a two-piece linear curve-fitting algorithm block diagram according to the present invention.

FIG. 3B depicts a two-piece linear curve-fitting algorithm block diagram according to the present invention. Current frame 302 is inputted into selector 320. Selector 320 determines if current frame 302 is less than a middle temperature intensity ("MIC") count calibrated in laboratory measurements. The MIC can separate the two ranges from each other. If yes, selector 320 inputs current frame 302 into FPN low estimator 330. If no, selector 320 inputs current frame 320 into FPN high estimator 340. Estimators 330 and 340 may correspond to estimator 102 shown in FIG. 1B. Corrected frame 380 is obtained by subtracting the estimated FPN determined by either FPN low estimator 330 or FPN high estimator 340 from current row image frame 302. FPN estimators 330 and 340 implement matrices A and B, as discussed above with reference to FIG. 3A.

The temperature range of −33° to 70° C. is divided into sub-dynamic ranges to provide greater flexibility in determining the offset and gain coefficients for the linear equation. The offset and gain for a pixel intensity value differs over the entire temperature range. By dividing into sub-ranges, the offset and gain relationship is kept linear over the entire temperature range.

Thus, the estimated FPN is determined and can be used for further operations, such as reducing the actual FPN for increased target recognition and tracking. By removing the estimated FPN, the actual FPN is suppressed to below or equal to the temporal noise level for the temperatures in the temperature dynamic range for seek and detect systems, such as system 100. According to the disclosed embodiments of the present invention, multiple temperature measurements are used. Preferably, ten to fifteen temperatures are used in forming the empirical measurements used for FPN estimation. A least-square algorithm is implemented to estimate the FPN across this temperature span. A NUC system, such as NUC component 116, uses a one-piece linear curve-fitting algorithm for the best five temperature ranges. Thus, all the temperatures within these ranges, such as 5° C. to 70° C., result in the residual FPNs below the temporal noise.

Further, the NUC component, such as NUC component 116, uses a two-piece linear curve-fitting algorithm for the other temperature ranges not covered by the one-piece linear curve-fitting algorithm. The two-piece linear curve-fitting algorithm further estimates the residual FPN better than the one-piece algorithm does for these ranges.

The trade-off is that the disclosed embodiments of the present invention can store four two-dimensional coefficient matrices instead of two. Alternatively, the one-piece algorithm or the two-piece algorithm can be used for all temperature ranges, wherein only two two-dimensional coefficient matrices are stored. These coefficient matrices are used by the FPN estimators, such as estimators 310, 330 and 340.

Further, the disclosed NUC component, such as NUC component 116, can handle the FPN drifts better than conventional NUC components. When implemented into an IR seeker, the disclosed NUC components show a FPN corrected image having fine edges that indicate most of the FPN has been suppressed. Further, the FPN is suppressed over all the temperature ranges, and not just the selected ranges temperatures.

The embodiments of the present invention disclose improvements over known NUC components, such as those using a chopper wheel configuration. For example, the disclosed embodiments of the present invention use measurement based parametric fitting that can be implemented in software configurations. Thus, the chopper wheel, its motor driver, and control electronics are eliminated. Further, the disclosed embodiments of the present invention can fit within a smaller space because it can be implemented in software and do not use additional mechanical or electrical components.

The disclosed embodiments of the present invention also perform at an increased FPN-reducing rate with no frame delay. The coefficients for estimating the FPNs are calculated using empirical measurements, and are pre-stored in the NUC component according to the disclosed embodiments. The FPN is corrected immediately when the NUC component acquires the image frame. Conventional chopper wheel NUC components subtract only a fraction of the FPN at each frame to avoid an increase of the temporal noise within the frame. For example, known chopper wheel NUC component can take 10 to 40 frames to suppress the FPN to a low value, depending on how much temporal noise increase is allowable.

The disclosed embodiments of the present invention also provide high correction accuracy without increasing temporal noise. The estimation of the FPN according to the disclosed embodiments of the present invention is based on the average of the multiple image frame sequence, which is about equal to or less than 600 frames. The estimated FPN coefficients are almost noise-free. Therefore, the temporal noise should not be increased when estimating the FPN from the uncorrected image in the seek and detect system, such as that disclosed by FIG. 1.

Another feature of the disclosed embodiments of the present invention is that the disclosed NUC component uniformly corrects other measurement and design errors, such as hot-dome shading, cosine$^4$ error, lens distortion, optical aberration, optical path design errors, reflection errors, stray-light errors, manufacture errors, and the like. Applicable measurements are determined after assembling the seeker, including the optics and dome, are finished. Therefore, all the manufacture and system errors disclosed above are treated as a portion of the FPN errors, and are included in the estimated FPN coefficients for later non-uniformity correction. Conventional chopper wheel NUC systems are unable to provide this feature as they are located in front of the FPA, but behind the optical system. Thus, known chopper wheel NUC devices should not be able to correct the errors caused by the optics and the dome.

It will be apparent to those skilled in the art that various modifications and variation can be made in the disclosed embodiments of the present invention without departing from the spirit or scope of the invention. Thus, it is intended that the present invention covers the modification and variations of this invention provided that they are encompassed by the scope of any claims and their equivalents.

What is claimed:

1. A system for reducing noise in a detection sensor detection, comprising:
   a raw digital image of pixels corresponding to energy received at the sensor;
   a non-uniformity correction device to remove estimated fixed pattern noise from the pixels of the raw digital image to generate a corrected digital image; and
   an array of coefficients to determine the estimated fixed pattern noise, wherein the array of coefficients are based on actual fixed pattern noise measurements that are parametrically fitted over a plurality of temperature ranges, wherein said corrected digital image is generated based on a low estimated fixed pattern noise when a current frame of said raw digital image is less than a middle temperature intensity count, otherwise the corrected digital image is generated based on a high estimated fixed pattern noise.

2. The system of claim 1, wherein each of the plurality of temperature ranges has an integration time for the sensor.

3. The system of claim 2, further comprising at least one capacitor to determine the integration time for the sensor.

4. The system of claim 2, wherein the integration time is an integration time for a focal plane array for the sensor.

5. The system of claim 4, wherein the raw digital image corresponds to the energy received at the focal plane array.

6. The system of claim 1, wherein the array of coefficients includes linear coefficients to determine the estimated fixed pattern noise.

7. The system of claim 1, wherein the non-uniformity correction device includes an estimator to determine the estimated fixed pattern noise over a set of the plurality of temperature ranges.

8. The system of claim 1, wherein the non-uniformity correction device includes a plurality of estimators to determine the estimated fixed noise over a set of the plurality of temperature ranges.

9. The system of claim 1, wherein the array of coefficients includes a first set of coefficients and a second set of coefficients.

10. The system of claim 9, wherein the first set of coefficients correlate to a first set of the plurality of temperature ranges, and the second set of coefficients correlate to a second set of the plurality of temperature ranges.

11. A sensor system for detecting candidate targets from received energy at an array of detectors within the sensor system, comprising:
   integration capacitors to control an integration time for the array of detectors to generate a voltage corresponding to the received energy;
   an analog-to-digital converter to convert the voltage to a raw digital image having pixel data of the candidate targets;
   a non-uniformity correction device to estimate the fixed pattern noise using an array of measurement-based parametrically fitted coefficients corresponding to a temperature range for the sensor system and to remove the estimated fixed pattern noise from the raw digital image, and
   a corrected image generated by the non-uniformity correction device that emphasizes the candidate targets in the pixel data, wherein said corrected digital image is generated based on a low estimated fixed pattern noise when a current frame of said raw digital image is less than a middle temperature intensity count, otherwise the corrected digital image is generated based on a high estimated fixed pattern noise.

12. The system of claim 11, wherein the received energy is infrared radiant flux.

13. The system of claim 11, wherein the array of coefficients includes gains and offsets determined from actual fixed pattern noise measurements.

14. The system of claim 11, wherein the integration time corresponds to the temperature range.

15. A method for reducing noise in a sensor, comprising:
   converting received energy into a raw digital image;
   estimating fixed pattern noise in the raw digital image by using an array of coefficients of parametrically fitted measurements of actual fixed pattern noise over a temperature range of a plurality of temperature ranges, and
   generating a corrected digital image by removing the estimated fixed pattern noise from the raw digital image, wherein said corrected digital image is generated based on a low estimated fixed pattern noise when a current frame of said raw digital image is less than a middle temperature intensity count, otherwise the corrected digital image is generated based on a high estimated fixed pattern noise.

16. The method of claim 15, wherein the estimating includes applying a gain and an offset from the array of coefficients to pixel intensity in the raw digital image.

17. The method of claim 15, further comprising generating a voltage from an array of detectors according to the received energy during an integration time of at least one capacitor.

18. The method of claim 17, further comprising adjusting the integration time.

19. The method of claim 15, wherein the estimating includes selecting the array of coefficients according to the temperature range.

20. A method for reducing noise in a digital image corresponding to energy received at a sensor, comprising:
   estimating fixed pattern noise in the digital image using an array of coefficients for a temperature range of a plurality of temperature ranges, wherein the array of coefficients represent a gain and an offset of the fixed pattern noise, and
   removing the estimated fixed pattern noise from the digital image to generate a corrected digital image, wherein said corrected digital image is generated based on a low estimated fixed pattern noise when a current frame of the digital image is less than a middle temperature intensity count, otherwise the corrected digital image is generated based on a high estimated fixed pattern noise.

21. The method of claim 20, further comprising converting the received energy into the digital image.

22. The method of claim 20, wherein the estimating includes applying the gain and the offset as a linear equation to pixel intensity within the digital image.

23. The method of claim 20, further comprising highlighting non-noise components within the corrected digital image.

24. A computer program product comprising a computer useable medium having computer readable code embodied therein for reducing noise in a sensor, the computer program product adapted when run on a computer to effect steps including:
- converting received energy into a raw digital image;
- estimating fixed pattern noise in the raw digital image by using an array of coefficients of parametrically fitted measurements of actual fixed pattern noise over a temperature range of a plurality of temperature ranges, and
- generating a corrected digital image by removing the estimated fixed pattern noise from the raw digital image, wherein said corrected digital image is generated based on a low estimated fixed pattern noise when a current frame of said raw digital image is less than a middle temperature intensity count, otherwise the corrected digital image is generated based on a high estimated fixed pattern noise.

25. A computer program product comprising a computer useable medium having computer readable code embodied therein for reducing noise in a digital image corresponding to energy received at a sensor, the computer program product adapted when run on a computer to effect steps including:
- estimating fixed pattern noise in the digital image using an array of coefficients for a temperature range of a plurality of temperature ranges, wherein the array of coefficients represent a gain and an offset of the fixed pattern noise, and
- removing the estimated fixed pattern noise from the digital image to generate a corrected digital image, wherein said corrected digital image is generated based on a low estimated fixed pattern noise when a current frame of the digital image is less than a middle temperature intensity count, otherwise the Corrected digital image is generated based on a high estimated fixed pattern noise.

* * * * *